United States Patent [19]

Ubezio

[11] 4,188,007
[45] Feb. 12, 1980

[54] DRAFTING BOARD BASE

[75] Inventor: Lorenzo Ubezio, Dietikon, Switzerland

[73] Assignee: Reppisch-Werke Aktiengesellschaft, Dietikon, Switzerland

[21] Appl. No.: 901,210

[22] Filed: Apr. 28, 1978

[51] Int. Cl.$^2$ ............................................. F16M 11/00
[52] U.S. Cl. ..................................... 248/411; 248/161
[58] Field of Search ................. 248/11, 161, 183, 411, 248/412, 414, 415, 418; 108/4, 6

[56] References Cited

U.S. PATENT DOCUMENTS

| | | | |
|---|---|---|---|
| 669,389 | 3/1901 | Gundry | 248/412 X |
| 1,186,992 | 6/1916 | Jargstorf | 248/183 |
| 1,919,114 | 7/1933 | Ley | 248/414 X |
| 2,567,593 | 9/1951 | Bemis | 108/4 |
| 2,851,126 | 9/1958 | Ward | 248/412 X |
| 2,947,556 | 8/1960 | Wenger | 248/161 X |
| 3,521,341 | 7/1970 | Hornlein et al. | 248/161 X |
| 3,695,700 | 10/1972 | Flach | 248/414 X |
| 3,873,054 | 3/1975 | McKee et al. | 248/418 X |

FOREIGN PATENT DOCUMENTS

| | | | |
|---|---|---|---|
| 668214 | 7/1929 | France | 248/161 |
| 1073838 | 9/1954 | France | 248/161 |

*Primary Examiner*—William H. Schultz
*Attorney, Agent, or Firm*—W. G. Fasse; D. F. Gould

[57] ABSTRACT

The present base for a drawing or drafting board or the like supports the board so that the latter is adjustable in the three directions of space. After each adjustment the board may be locked in the adjusted position by a respective safety or locking device. These safety or locking devices are so arranged and constructed that a yielding is provided in response to the reaching of a load limit applied to the drawing or drafting board whereby damage to the board and its supporting structure is avoided.

5 Claims, 6 Drawing Figures

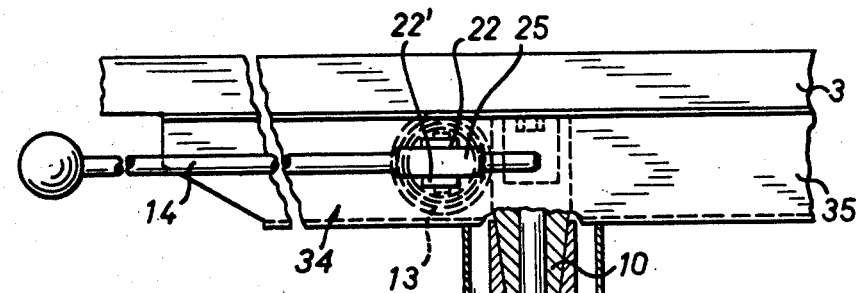
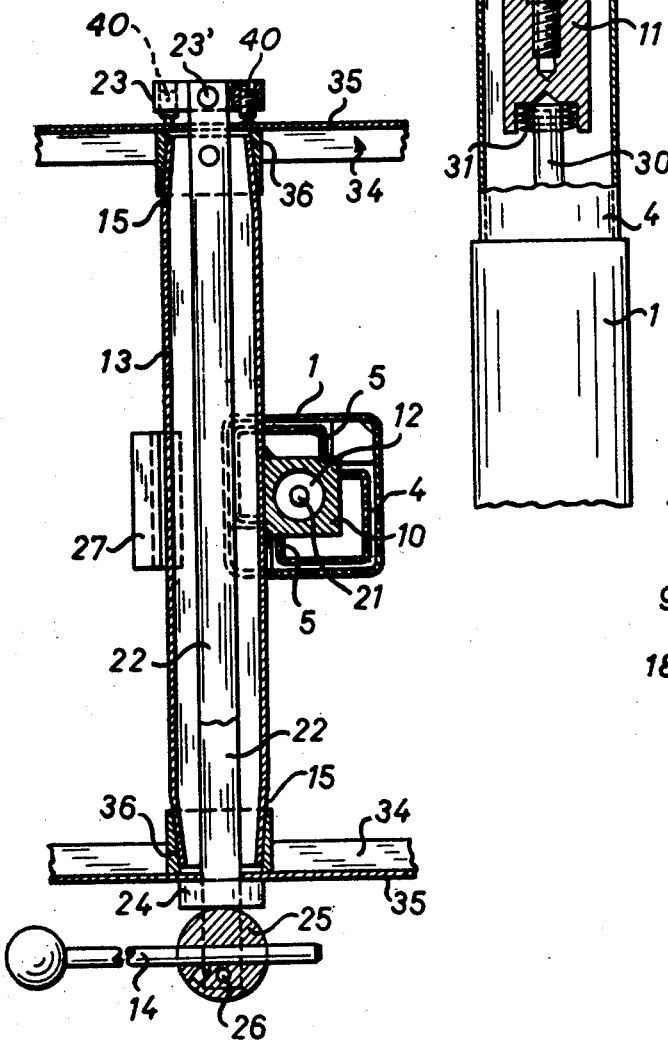
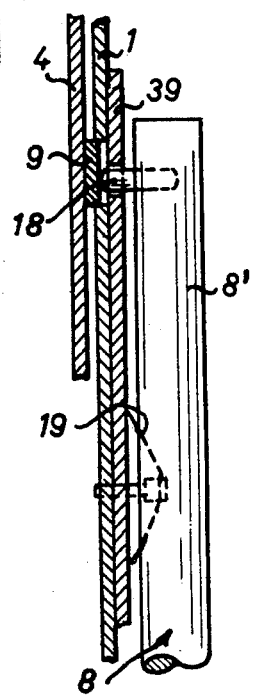
Fig. 2
Fig. 3
Fig. 4

DRAFTING BOARD BASE

BACKGROUND OF THE INVENTION

The invention relates to a drafting board base which is used to support a working surface, for example, for drafting or drawing purposes. The base includes an upright column which supports the drafting or drawing board proper in a load relieved manner. Conventionally, the board forming the working surface is adjustable in the three directions of space to take up different elevational positions as well as different angular positions relative to the horizontal and also different rotational positions relative to the vertical. In each of these positions, the board may be locked after proper adjustment.

The rigid locking devices which have been employed heretofore are subject to damage if the board should be exposed to excessive loads.

OBJECTS OF THE INVENTION

In view of the foregoing, it is the aim of the invention to achieve the following objects, singly or in combination:

to construct a base for a drawing or drafting board wherein the adjustment mechanism may not be damaged even if heavy loads should be applied;

to provide an adjustment mechanism for a drafting or drawing board which is of simple and light construction and which permits a rapid adjustment;

to include in the adjustment and safety or locking mechanism slipping means such as a slipping clutch which will protect the adjustment mechanism against overloads; and to substantially improve the useful life of a drafting apparatus according to the invention.

SUMMARY OF THE INVENTION

According to the invention there is provided a base for a drafting or drawing board which base comprises an upright column for carrying the board in a load relieved manner. The board is adjustable and securable in its elevational position. Further, the board is rotatable and tiltable relative to that portion of the upright column which is adjustable in the elevational position. Brake elements are provided for the securing of the elevational position of the board. Further brake elements are provided for securing the position against rotation about the vertical, longitudinal column axis. Third brake elements are provided for securing the board in its tilted position after the board has been tilted about the horizontal rotational support. These brake elements are so adjusted or adjustable that a slipping of the brake elements is made possible even before a permissible load is reached especially when the board is subject to a load or stress not normally intended and hence improper.

The combination of three brake mechanisms which respond to excessive loads by a slipping action results in an especially simple structure of the drafting board base while simultaneously protecting the structure against overloads.

BRIEF FIGURE DESCRIPTION

In order that the invention may be clearly understood, it will now be described, by way of example, with reference to the accompanying drawings, wherein:

FIG. 2 illustrates the upper portion of the base and parts of the board whereby the latter is in its elevated position;

FIG. 3 is a longitudinal section through the horizontal tilting bearing of the drafting board or table along the section line III—III in FIG. 1;

FIG. 4 is an elevational view of an arm of a pedal for operating the present mechanism including a sectional view through respective brake elements;

FIG. 5 is a horizontal sectional view through the upright column shown in FIG. 1 along section line V—V; and FIG. 6 shows the tilting bearing element of FIG. 3 in a perspective view for tilting and holding a drawing board or the like.

Figure 1:
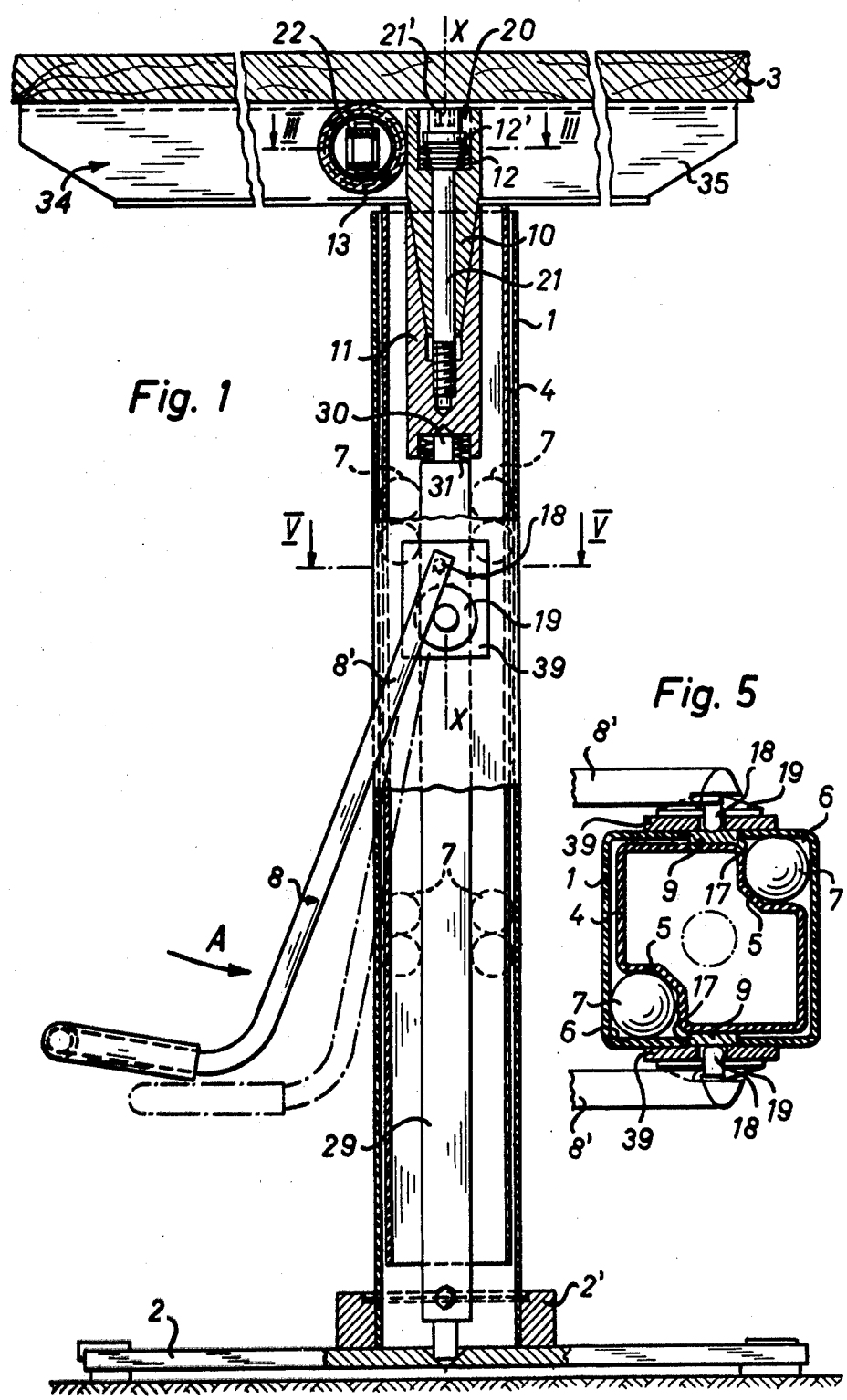
FIG. 1 illustrates the drawing or drafting board base according to the invention in a vertical, axial section, whereby the board is shown in its lowered down position.

DETAILED DESCRIPTION OF PREFERRED EXAMPLE EMBODIMENTS:

Referring to FIG. 1 there is shown an upright column 1 secured to a pedestal forming together the base proper. The upright column 1 comprises a hollow sectional member inside of which there is arranged a hollow column 4 carrying at its top the table or board 3. The hollow column 4 is adjustable in its elevational position and secured against rotation by guide means inside the upright column 1. The guide means comprise two longitudinal guide grooves 5 arranged in the hollow column 4 at two oppositely positioned longitudinal edges thereof. Adjacent corners of the hollow column 4 form corner guide grooves 6 which receive balls 7, whereby the inner hollow column 4 is guided without any play. Two brake plates 9 rest against the hollow column 4 which is adjustable in its elevational position. These brake plates 9 make it possible to block the hollow column 4 relative to the upright column 1 when the hollow column 4 is in its extended position. The brake pressure is exerted by means of a spring bail 8 having a U-configuration. The bail 8 is constructed as a brake pedal. The bail 8 is provided at its upper end with legs 8' into which there are inserted pressure bolts 18 forming the tilting axis of the bail 8. The pressure bolts 8 extend through a respective bore in the bearing plate 39. The bearing plates are guided in openings 17 arranged opposite each other in the outer hollow upright column 1. The spring elastic legs 8' of the bail 8 press the bolts 18 against the brake plates 9 which in turn rest against the inner hollow column 4. Conical discs 19 are arranged on a bearing plate 39 below the pressure bolts 18 and on the outer surface of the upright column 1. In operation, when the bail 8 is tilted toward the upright column 1, that is in the direction of the arrow A, the bail legs 8' are spread apart and the brake plates 9 are relieved from the brake load. Thus, the elevational position of the drafting board 3 is possible. Upon release of the bail 8, the latter simultaneously tilts back into the original position due to its inherent spring characteristic, whereby the brake plates 9 are again subjected to the full brake load. Incidentally, in FIG. 1 the brake position of the bail 8 is shown in full lines and the release position of the bail 8 is shown in dash-dotted lines.

As best seen in FIG. 2, the drawing or drafting board 3 which is rotatable about the vertical axis X—X, shown in FIG. 1, reaches with a vertically extending, conical brake piston 10 into a respectively shaped conical recess formed in a support member 11 which is rigidly secured to the hollow column 4. The conical brake piston 10 is secured to the board 3. The axially upwardly facing end of the brake piston 10 is provided with an axially extending recess 20. A spring element 12 functioning as a clamping disc is located in the recess 20. A clamping screw 21 extends through the spring element 12. The spring element 12 is effective against the bottom of the depression 20 of the brake piston 10 through the head 21' of the clamping screw 21 and through the axial bearing 12'. The conical brake piston 10 is thus pressed into the hollow conical recess in the support member 11, whereby the brake pressure is produced. The brake pressure may be adjusted as desired by adjusting the clamping screw 21, whereby a slip-type clutch function is accomplished so that the drafting or drawing board 3 may be rotated about the vertical upright column axis X when the resistance of the slip clutch arrangements is overcome.

Figure 6:
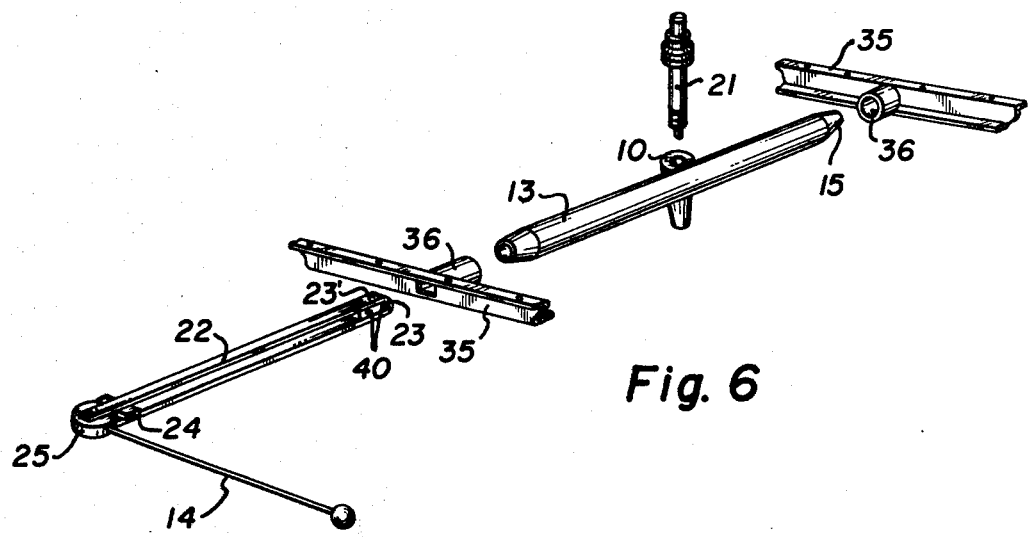

As shown in FIGS. 3 and 6 a horizontally extending support pipe 13 is rigidly connected to the conical brake piston 10. The support pipe 13 has conically tapering ends 15 which reach into respectively shaped hollow conical recesses in brake bushings 36 secured to the surfaces of supporting sectional members 34 which surfaces face each other.

A pull rod 22 extends axially through the support pipe 13. A locking member 23 is located at one end of the pull rod 22 and rests against the leg 35 of the supporting sectional member 34. The locking member 23 is tiltable about a journal bolt 23' so that the locking member 23 may extend in the direction of the rod 22 for inserting the rod 22 from one end through the support pipe 13. When the rod 22 extends entirely through the pipe 13, the locking member 23 is tilted into the position shown in FIG. 3 whereby withdrawal of the rod 22 with from the pipe 13 is prevented. Set screws 40 may extend through the locking member 23 to bear against the leg 35 when the locking member 23 is in the locking position shown in FIG. 3. Thus, it is possible to arrange the cocking lever 14 selectively on the left side or on the right side of the structure. An eccentric member 25, forming part of the actuating lever 14, is rotatably secured by means of a journal bolt 26 at the other end of the pull rod 22. The eccentric member 25 is effective for cooperation with a spacer member 24 which rests against the outer surface of the leg 35 of the support sectional member 34.

As long as no excessive load or stress is applied to the board 3, the brake pressure produced by the eccentric member 25 prevents a tilting of the drawing board 3 about the support pipe 13. The flexible leg 35 of the support sectional member 34 bends slightly intermediate the clamping position and the non-clamping position. Said flexible leg 35 extends approximately at a right angle relative to the drawing board 3. The spring flexible leg 35 of the support sectional members 34 tends to pull the two brake bushings 36 with their conical recesses into their position in which they do not provide a brake clamping action when the eccentric member 25 is released.

As shown in FIG. 1, a piston cylinder arrangement 29 is located inside the hollow column 4. The piston cylinder arrangement 29 rests on the pedestal 2 to which the outer upright column 1 is secured, for example, by a bushing 2'. The piston 30 of the piston cylinder arrangement 29 is spring supported and operatively connected to the support member 11 with its conical recess. Since the latter is connected through the conical bearing member 10 to the board 3, which in turn is also connected to the inner hollow column 4, the piston cylinder arrangement 29, 30 provides a support also for the inner column in the manner of a gas spring. Thus, the gas spring support of the just described components provides the load relief required for an effortless elevational adjustment of the drafting board 3. The load relief could be achieved by other well known means not necessarily of the gas spring type as just described. A disk spring element 31, for example of the Belleville type, serves as an end stop for limiting the stroke of the drawing board 3 in the downward, lowered direction.

In operation, the above described brake plates 9 secure the inner hollow column 4 against an elevational displacement except when the vertical force applied to the board 3 exceeds the frictional force between the brake plates 9 and the hollow tube 4. The clamping disk spring element 12 and the clamping screw 21 secure the board 3 against rotation about the vertical axis X—X, except when the respective forces applied to the board 3 exceed the force determined by the disk spring element 12 and the friction between the conical member 10 and the conical surface of the recess in the support member 11. The third braking action is accomplished by the friction between the tapering ends 15 of the support pipe 13 in the conical recesses of the brake bushings 36 in cooperation with the eccentric member 25. This third braking action prevents a tilting of the board 3 about the horizontal axis of the support pipe 13. Here again, a slippage is provided when the applied force exceeds the braking force.

Although the invention has been described with reference to specific example embodiments, it is to be understood, that it is intended to cover all modifications and equivalents within the scope of the appended claims.

What is claimed is:

1. A base for a table top, especially a drafting board, comprising first stationary hollow upright column means, second column means slidably supported in said first column means for vertical up and down adjustment of said column means relative to said first column means, substantially horizontally extending table top support means, means operatively connecting said table top support means to said second column means, and slip brake means operatively interposed between said first and second column means, said slip brake means comprising two openings arranged opposite each other in said first column means, brake plate means guided in said openings, U-shaped bail means having spring elastic legs operatively arranged for exerting pressure on said brake plate means, intermediate members operatively interposed between said brake plate means and spring elastic legs of said bail means, relatively flat conical disk means secured on each side below the rotational axis of said U-shaped bail means, said spring elastic legs of said U-shaped bail means running onto said conical disks when the U-shaped bail means is tilted inwardly toward said column means, whereby the load on said brake plate means is relieved for the elevational adjustment of the second column means and whereby the brake plate means are subjected to the full load again when the U-shaped bail means is released to thus simultaneously tilt back into its normal position.

2. The base of claim 1, wherein said means operatively connecting said table top support means to said second column means comprise second slip brake means comprising spring means for adjusting the slip action of the second slip brake means against rotation of said table top about a vertical axis, said spring means comprising clamping disk means, conical brake piston means, a coaxial recess in said brake piston means, said clamping disk means being located in said coaxial recess, clamping screw means having a head and axial bearing means extending axially through the conical brake piston means, a hollow cone support member for said brake piston means secured to said second column, said clamping screw means adjustably engaging said support member for pressing with its axial bearing means said spring means against the bottom of said recess, said clamping screw means being adjustable in said hollow cone support member for controlling the frictional resistance of the brake piston means against its rotation in said hollow cone support member.

3. The base of claim 1, further comprising third slip brake means operatively interposed between the table top proper and the table top support means, said third slip brake means comprising brake bushing means with a conical recess in each brake bushing means, said table top support means comprising a support pipe having conically tapering ends forming part of said third slip brake means and cooperating with a respective conical recess in the respective brake bushing means, spring elastic means carrying said table top, each brake bushing means being secured to a respective one of said spring elastic means which in turn is rigidly connected to the table top, pull rod means extending through said support pipe, said pull rod means having a locking member at its free end and a spacer member adjacent its other end, an eccentric cam member including an actuating lever, a journal bolt supporting said eccentric cam member for rotation to cooperate with said spacer member which rests against the outer side of the spring elastic means (3, 5).

4. The base of claim 3, wherein said locking member (23) is tiltable out of its normal position substantially across said pull rod (22), into a position extending substantially axially relative to said pull rod, whereby the pull rod is axially insertable into the support pipe (13), from one or from the opposite end of the support pipe to thereby provide for operating the actuating lever of the eccentric cam member (25) either with the right hand or with the left hand when the locking member (23) is in the locking position.

5. The base of claim 1, wherein said first column means have a prismatic cross-sectional shape whereby two opposite, inwardly facing corners of said first column means provide first vertical guide grooves, said second column means fitting into said first column means and having two radially inwardly directed, longitudinally extending second vertical guide groove means located diagonally opposite each other and opposite the respective first guide groove whereby the first and second guide grooves form two guide channels and ball means located in said two guide channels whereby the second column means are secured against rotation and adjustable in its elevation relative to said first column means.

* * * * *

UNITED STATES PATENT OFFICE
CERTIFICATE OF CORRECTION

Patent No. 4,188,007   Dated February 12, 1980

Inventor(s)   Lorenzo Ubezio

It is certified that error appears in the above-identified patent and that said Letters Patent are hereby corrected as shown below:

Claim 1, line 5, before "column" (first occurrence) insert --second--.

Signed and Sealed this

Twentieth Day of May 1980

[SEAL]

Attest:

SIDNEY A. DIAMOND

Attesting Officer   Commissioner of Patents and Trademarks